US011261902B2

(12) United States Patent
Adams

(10) Patent No.: US 11,261,902 B2
(45) Date of Patent: Mar. 1, 2022

(54) PIN LOCK FASTENERS

(71) Applicant: Raytheon Company, Waltham, MA (US)

(72) Inventor: Richard J. Adams, Charlestown, MA (US)

(73) Assignee: Raytheon Company, Waltham, MA (US)

( * ) Notice: Subject to any disclaimer, the term of this patent is extended or adjusted under 35 U.S.C. 154(b) by 315 days.

(21) Appl. No.: 16/439,562

(22) Filed: Jun. 12, 2019

(65) Prior Publication Data

US 2020/0392978 A1    Dec. 17, 2020

(51) Int. Cl.
*F16B 39/10*    (2006.01)
*F16B 37/14*    (2006.01)

(52) U.S. Cl.
CPC .............. *F16B 39/10* (2013.01); *F16B 37/14* (2013.01)

(58) Field of Classification Search
CPC ...... F16B 21/125; F16B 33/002; F16B 37/14; F16B 39/00; F16B 39/10; Y10S 411/97; Y10S 411/929
USPC ........ 411/166, 167, 262, 347, 511–512, 916, 411/987
See application file for complete search history.

(56) References Cited

U.S. PATENT DOCUMENTS

| | | | |
|---|---|---|---|
| 926,517 A * | 6/1909 | Terry ...................... | F16B 37/12 411/262 |
| 947,057 A * | 1/1910 | Douglass et al. ....... | F16B 37/12 411/262 |
| 1,189,081 A * | 6/1916 | Fitz Gerald ............. | F16B 37/12 411/262 |
| 1,502,555 A * | 7/1924 | Eklund ................... | F16B 39/32 411/262 |
| 1,898,202 A * | 2/1933 | Murray .................. | A44B 15/00 70/456 R |
| 2,587,560 A * | 2/1952 | Widmer .................. | F16B 39/12 411/231 |

(Continued)

FOREIGN PATENT DOCUMENTS

| GB | 215593 A | 5/1924 |
|---|---|---|
| JP | S53-116568 U | 9/1978 |
| WO | WO 2014/017209 A1 | 1/2014 |

OTHER PUBLICATIONS

International Search Report for International Application No. PCT/US2020/027811 dated Jun. 23, 2020, 35 pages.

*Primary Examiner* — Roberta S Delisle

(57) ABSTRACT

A pin lock fastener comprises a fastener component (e.g., bolt or nut) having an aperture formed through an outer surface of the fastener component, and a pin supported by the fastener component and slidable through the aperture. The pin can comprise a locking end portion to interface/lock with a pin lock feature of a fastener receiver structure. The pin lock fastener can comprise an actuator cap rotatably coupled to the fastener component, and a torsion spring can have a first end coupled to the fastener component and a second end coupled to the actuator cap. The pin can be secured to the torsion spring that applies a biasing force to the pin in a normal locked position to restrict rotation of the fastener component relative to the fastener receiver structure secured to the fastener component. The pin lock fastener can be repeatedly used. Associated fastened assemblies and methods are provided.

26 Claims, 13 Drawing Sheets

(56) References Cited

U.S. PATENT DOCUMENTS

| | | | |
|---|---|---|---|
| 2,690,682 A * | 10/1954 | Passman | F16H 25/2006 |
| | | | 74/441 |
| 4,297,063 A | 10/1981 | Hart | |
| 5,449,259 A * | 9/1995 | Clohessey | F16B 39/32 |
| | | | 411/252 |
| 6,015,251 A * | 1/2000 | Chung | F16B 39/32 |
| | | | 411/252 |
| 8,608,421 B1 * | 12/2013 | Halsey | F16B 31/04 |
| | | | 411/204 |
| 2011/0027041 A1 | 2/2011 | Friesen et al. | |
| 2011/0176887 A1 * | 7/2011 | Im | F16B 39/38 |
| | | | 411/262 |

* cited by examiner

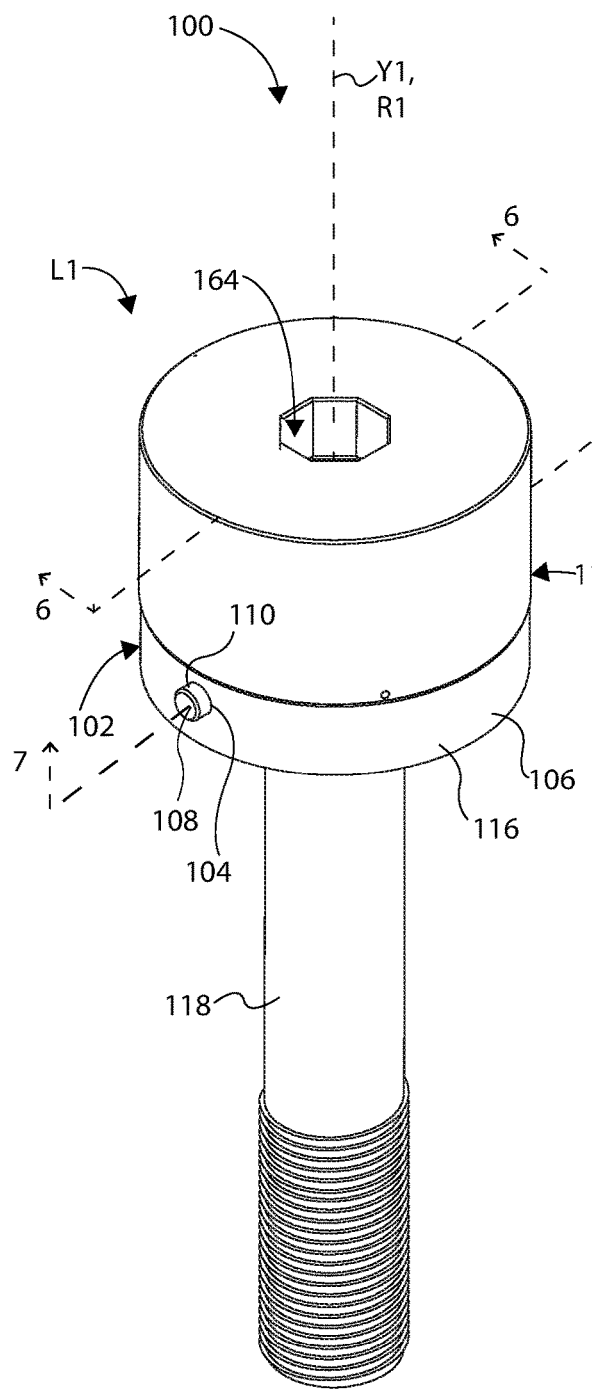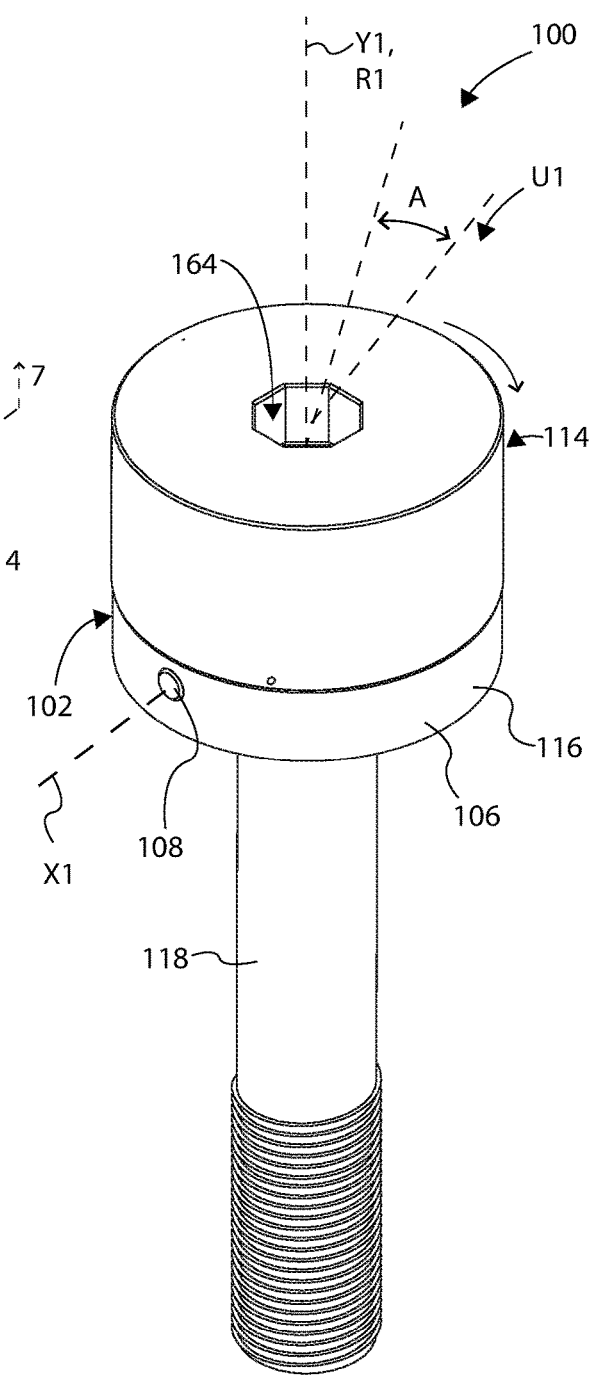
*FIG. 1A*  *FIG. 1B*

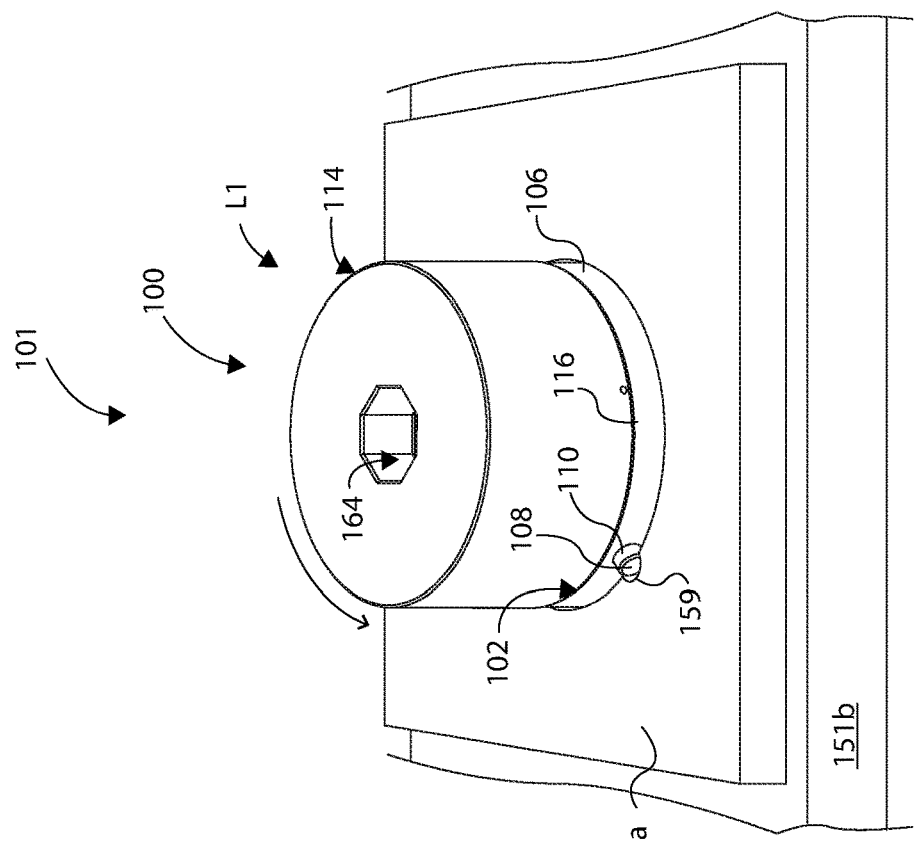
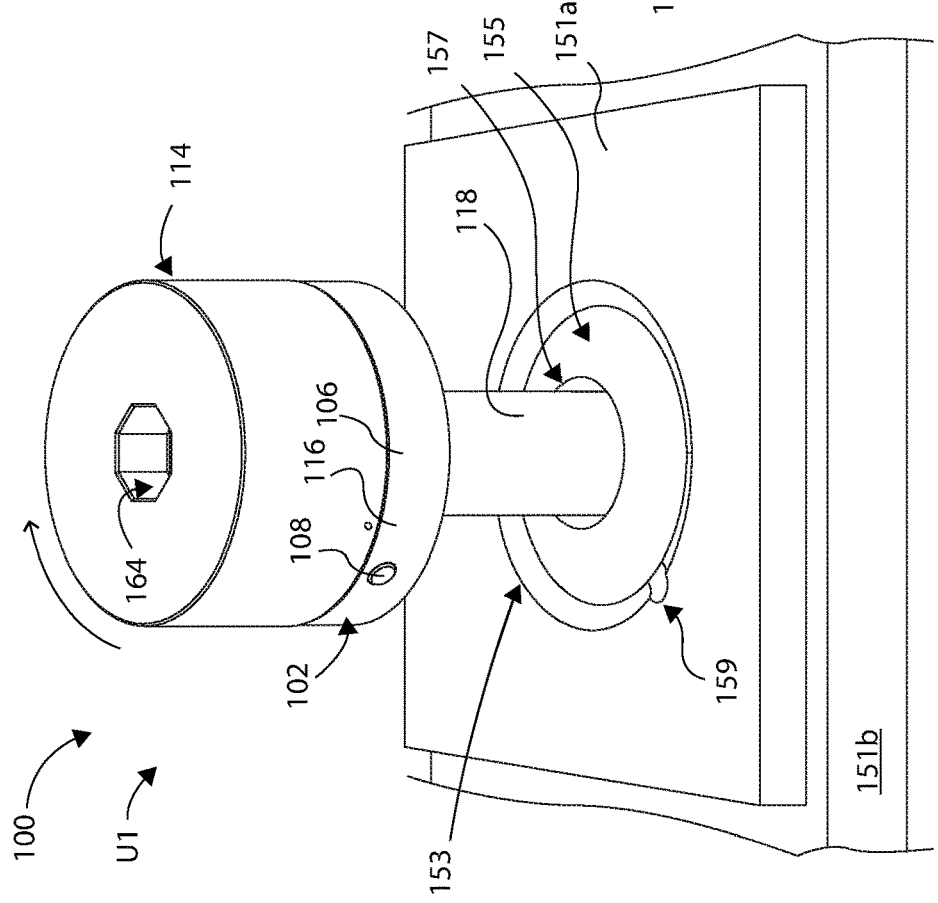

PIN LOCK FASTENERS

GOVERNMENT LICENSE RIGHTS

This invention was made with Government support under Contract No. N00024-16-C-5144 awarded by the US Navy. The Government has certain rights in the invention.

BACKGROUND

It is often desirable to lock fasteners (e.g., bolts, nuts) to members or structures to prevent loosening of the fastener from the structures. Examples of locking fasteners includes nylon locking nuts, Loctite screws, nylon patch screws, wire locked screws, and others. Such locking fasteners are not always reliable or effective, particularly in high-vibration environments that can cause loosening of the fasteners over time due to the vibrations. Reliability can also be a concern due to improper installation of the locking fastener to a structure, or because a user did not apply a sufficient amount of thread locking material to the threads, for instance. Finally, such locking fasteners are not easily re-usable in terms of removing and re-installing the fasteners to a structure, in part because the initial installation or the removal of the locking fastener (or both) can damage or irreversibly alter the construction integrity of the locking fastener (e.g., nylon locking nuts being deformed to a degree such that they are no longer viable).

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1A is an isometric view of a pin lock fastener and in a normal locked position, in accordance with an example of the present disclosure.

FIG. 1B shows the pin lock fastener of FIG. 1A, in a retracted unlocked position.

FIG. 1C shows the pin lock fastener of FIG. 1A in the retracted unlocked position, and received through first and second fastener receiver structures, in accordance with an example of the present disclosure.

FIG. 1D shows the pin lock fastener of FIG. 1A in the normal locked position and fastened to the first and second fastener receiver structures of FIG. 10, and rotatably locked to the first fastener receiver structure.

FIG. 10B shows an exploded isometric view of the pin lock fastener of

FIG. 10A.

Figure 2:
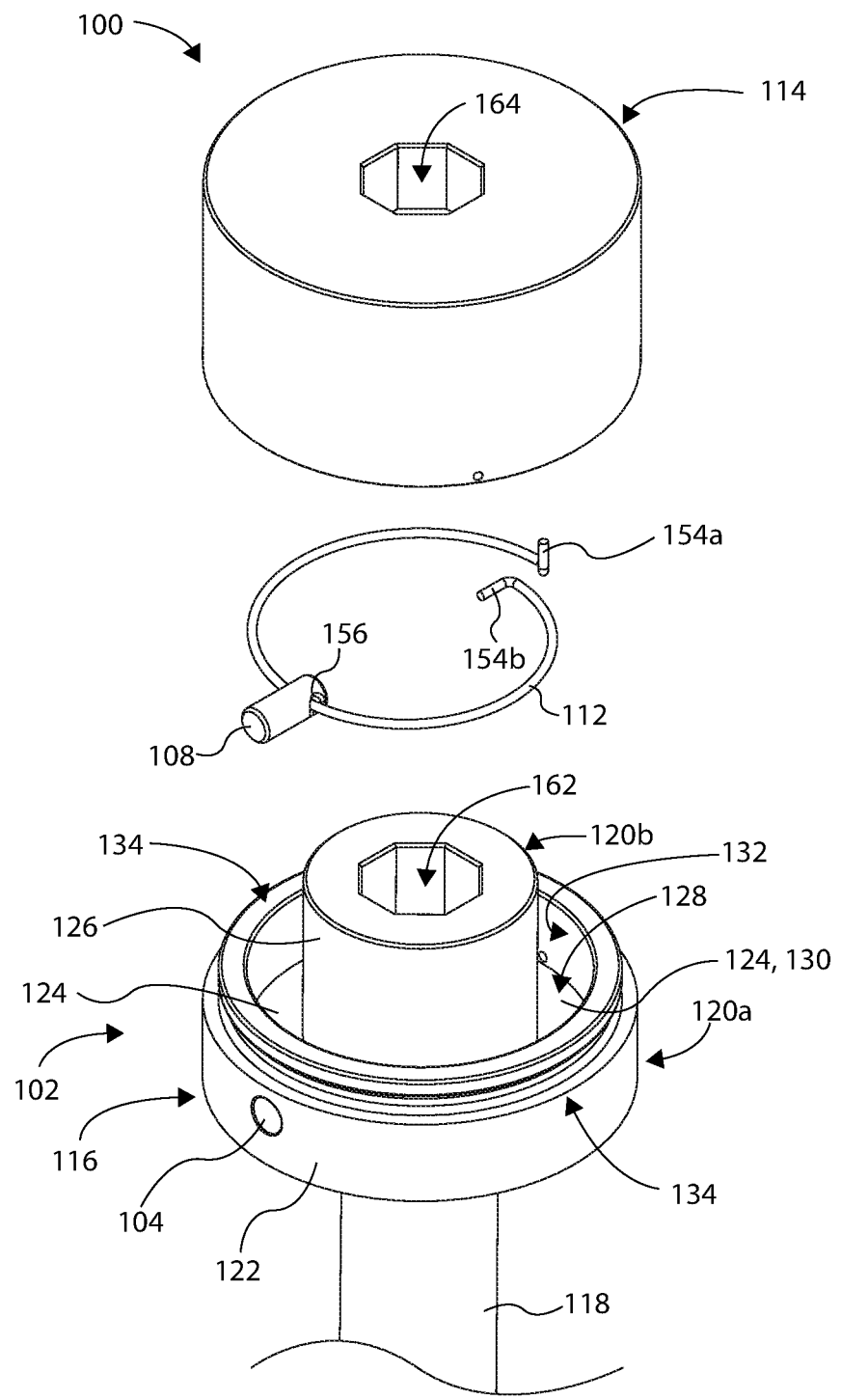
FIG. 2 is an exploded view of the pin lock fastener of FIG. 1A.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth a pin lock fastener comprising a fastener component having an aperture formed through an outer surface of the fastener component, and a pin supported by the fastener component and slidable through the aperture (the pin comprises a locking end portion. An elastic element can be supported by the fastener component and can be operable to apply a biasing force to the pin. The elastic element biasing the pin in a normal locked position such that the locking end portion of the pin extends outwardly from the outer surface of the fastener component. A pin actuation component can be coupled to the fastener component and can be operable to facilitate application of a force to actuate the pin from the normal locked position to a retracted unlocked position. When in the normal locked position, the locking end portion of the pin is operable to interface with a fastener receiver structure to restrict rotation of the fastener component relative to the fastener receiver structure.

In one example, the fastener component comprises a bolt comprising a bolt head body and a shaft extending from the bolt head body. The bolt head body comprises the aperture and at least partially supports the elastic element.

In one example, the pin actuation component comprises an actuator cap bi-directionally rotatably coupled to the bolt head body, and the elastic element comprises a torsion spring having one end coupled to the actuator cap and the other end coupled to the bolt head body. The pin can be coupled to the torsion spring between the ends of the torsion spring, such that rotation of the actuator cap causes deflection of the torsion spring to actuate the pin.

In one example, the fastener component comprises a nut body comprising the aperture and supporting the pin, and at least partially supporting the elastic element. The nut body can be configured to be fastened to a bolt.

The present disclosure sets forth a pin lock fastener comprising a fastener component having an aperture formed through an outer surface of the fastener component, and a pin supported by the fastener component and slidable through the aperture. The pin can comprise a locking end portion. An actuator cap can be rotatably coupled to the fastener component, and a torsion spring can have a first end coupled to the fastener component and a second end coupled to the actuator cap. The pin can be secured to the torsion spring between the first and second ends of the torsion spring, and can be operable to apply a biasing force to the pin in a normal locked position, such that the locking end portion of the pin extends outwardly from the outer surface of the fastener component. The actuator cap is operable to be rotated relative to the fastener component in a first direction that causes deflection of the torsion spring, thereby actuating the pin from the normal locked position to a retracted unlocked position to facilitate threadably securing the fastener component to a fastener receiver structure. When the fastener component is secured to the fastener receiver structure, the torsion spring exerts a biasing force to rotate the actuator cap in a second direction and to return the locking end portion of the pin to the normal locked positon to lock the pin to the fastener receiver structure to restrict rotation of the fastener component relative to the fastener receiver structure.

The present disclosure sets forth a fastened assembly comprising a first member having a first fastener opening, a second member having a second fastener opening, and a pin lock fastener that fastens together the first and second members. The pin lock fastener can comprise a fastener component secured to at least one of the first member or the second member, and a pin supported by the fastener component and comprising a locking end portion. The pin lock fastener can comprise an elastic element supported by the fastener component and operable to apply a biasing force to the pin such that the locking end portion of the pin is interfaced to at least one pin lock feature of the first member, thereby restricting rotation of the fastener component relative to the first member.

To further describe the present technology, examples are now provided with reference to the figures. With reference to FIGS. 1A-7, various aspects and views are provided of a pin lock fastener 100 in accordance with an example of the present disclosure. As an overview, the pin lock fastener 100 can be used to fasten or secure together two or more fastener receiver structures or members, and can be operable to be rotatably locked to one of the fastener receiver structures or members, as further described below (e.g., see FIGS. 1C and 1D). The pin lock fastener 100 is configured to be normally or automatically placed in a normal locked position L1 (e.g., see this illustrated in FIGS. 1A and 10), and operable by a user (or machine) to be moved to a retracted unlocked position U1 (e.g., see this illustrated in FIGS. 1B and 10), before and during fastening together two or more structures or members.

As mentioned above, in high vibration environments, a traditional locking fastener can become loosened over time due to such vibration, which can be quite problematic, particularly in high-performance systems, vehicles, sensor platforms, etc. that rely on numerous fasteners to remain assembled. It should be appreciated that the configuration and operation of the examples of the present disclosure provide one benefit of a fastener that is capable of remaining in the locked position (e.g., see FIG. 1D, and also FIGS. 8, and 9) despite experiencing high vibrations, for instance, that would otherwise tend to "unlock" or "decouple" other traditional locking fasteners from their fastened members or structures.

More specifically, the pin lock fastener 100 can comprise or can be configured as a bolt 102, having an aperture 104 formed through an outer surface 106 of the bolt 102. The pin lock fastener 100 can further comprise a pin 108 supported by the bolt 102, and that is slidable through the aperture 104. The pin 108 can comprise a locking end portion 110 that extends outwardly from the outer surface 106 of the bolt 102 when in the normal locked position L1 (see FIGS. 1A and 1D). Thus, the pin 108 is captive or captured by the bolt 102. The pin lock fastener 100 can comprise an elastic element, such as a torsion spring 112 (see FIGS. 2-7), supported by the bolt 102 and operable to apply a biasing force to the pin 108. The torsion spring 112 can operate to apply a force on the pin 108 to bias the pin 108 in the normal locked position L1, such that the locking end portion 110 of the pin 108 extends outwardly from the outer surface 106 of the bolt 102 to interface or lock with a fastener receiver structure or member (e.g., see FIGS. 1D, 8 and 9).

Figure 5A:
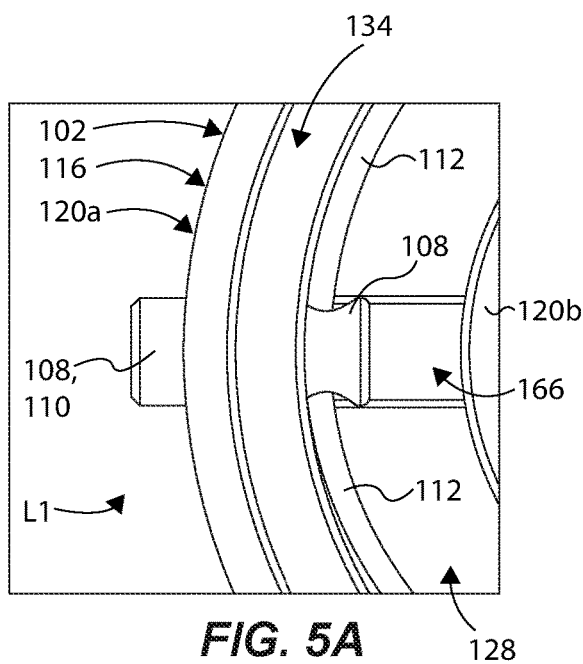
FIG. 5A is a close up view of the section of FIG. 4 delineated by dotted lines, with the pin lock fastener of FIG. 1A shown in the normal locked position.
Figure 5B:
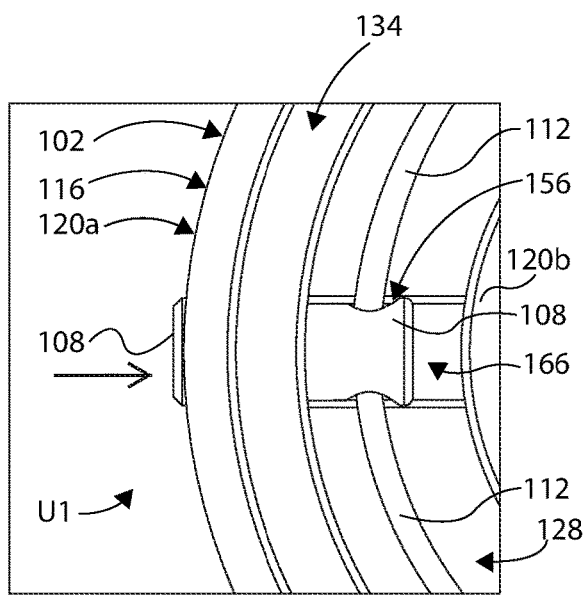
FIG. 5B is a close up view of the section of FIG. 4 delineated by dotted lines, with the pin lock fastener of FIG. 1A shown in the retracted unlocked position.

The pin lock fastener 100 can further comprise a pin actuation component, such as an actuator cap 114, rotatably coupled to the bolt 102 and operable with the torsion spring 112 to facilitate application of a force to actuate the pin 108, via deflection of the torsion spring 112, from the normal locked position L1 to the retracted unlocked position U1 (see e.g., FIGS. 5A and 5B). Thus, as further detailed below, when in the normal locked position L1, the locking end portion 110 of the pin 108 is operable to interface with a fastener receiver structure or member to restrict rotation of the bolt 102 relative to the fastener receiver structure (e.g., see FIGS. 1D, 8 and 9), thus preventing inadvertent loosening of the pin lock fastener 100 and subsequent unlocking or decoupling from the fastener receiving structures or members fastened by the pin lock fastener 100 even when subjected to high vibrations.

The bolt 102 can comprise a bolt head body 116 and a shaft 118 extending from the bolt head body 116. The shaft 118 can be partially or fully threaded along its length for being threaded into to one or more nuts, or to a threaded opening of a fastener receiver structure. The bolt head body 116 can comprise a first head portion 120a and a second head portion 120b. The first head portion 120a can comprise the outer surface 106 that extends circumferentially around a perimeter of the bolt head body 116, and can comprise the aperture 104 that is formed laterally through an annular body 122 of the first head portion 120a. The first head portion 120a can further comprise a channel portion 124 that extends between the annular body 122 and the second head portion 120b. The channel portion 124 can be defined by a planar, horizontal wall or surface that extends laterally between the annular body 122 and the second head portion 120b. Thus, channel portion 124 can define an annular gap between the annular body 122 and an outer circumferential surface 126 of the second head portion 120b. In this configuration, the bolt head body 116 can comprise a spring support channel 128 that extends about or around and that includes, at least in part, the channel portion 124. Indeed, the spring support channel 128 can be defined, at least partially, by an upper surface 130 of the channel portion 124, an inner circumferential surface 132 of the annular body 122, and the outer circumferential surface 126 of the second head portion 120b. As further detailed below, at least a portion of the torsion spring 112 can be situated or disposed within at least a portion of the spring support channel 128, so that the torsion spring 112 can deflect during unlocking and locking operations of the pin lock fastener 100.

Figure 3:
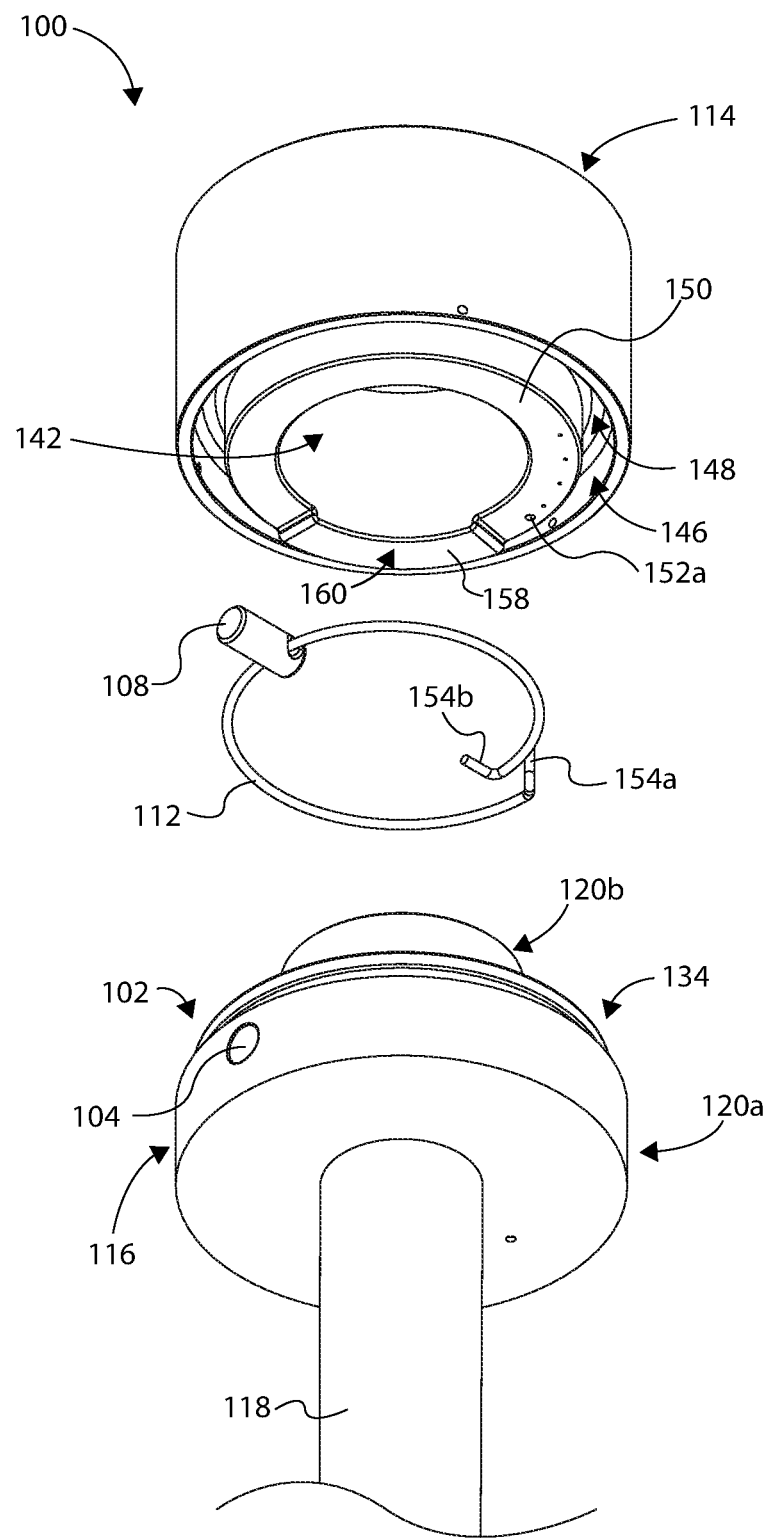
FIG. 3 is another exploded view of the pin lock fastener of FIG. 1A from a different perspective.
Figure 4:
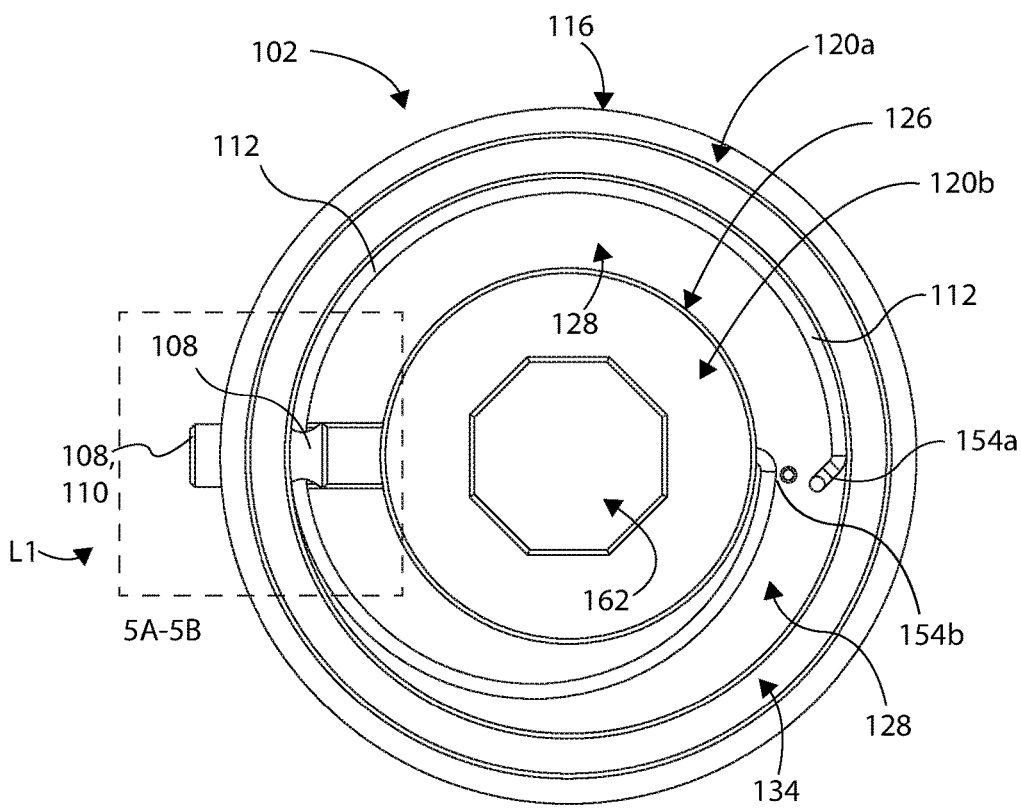
FIG. 4 is a top view of the fastener component, spring, and pin elements of the pin lock fastener of FIG. 1A, shown in the normal locked position.
Figure 6:
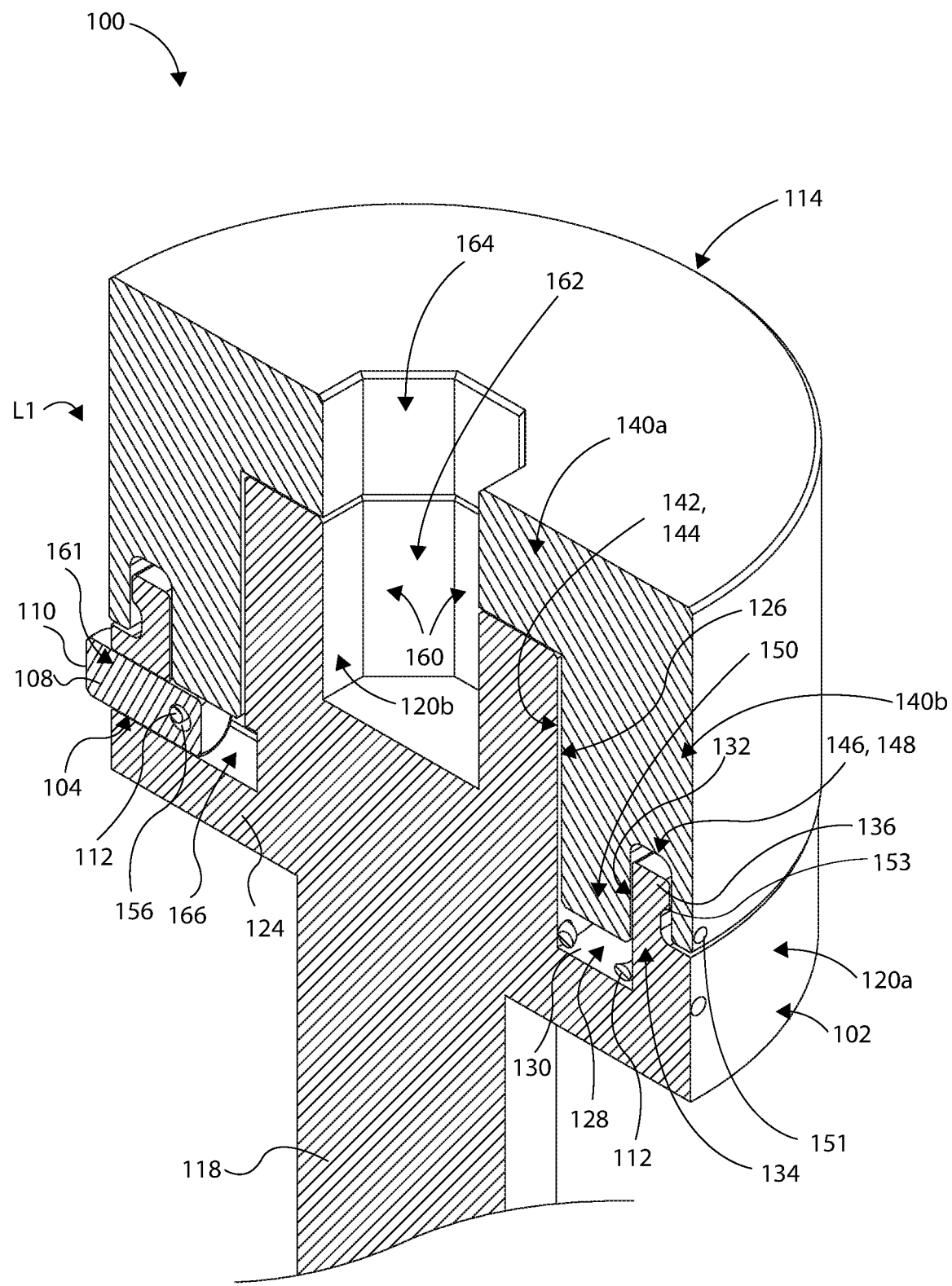
FIG. 6 is a cross-sectional view of the pin lock fastener of FIG. 1A, and taken along lines 6-6, with the cross-sectional view rotated ninety degrees.
Figure 7:
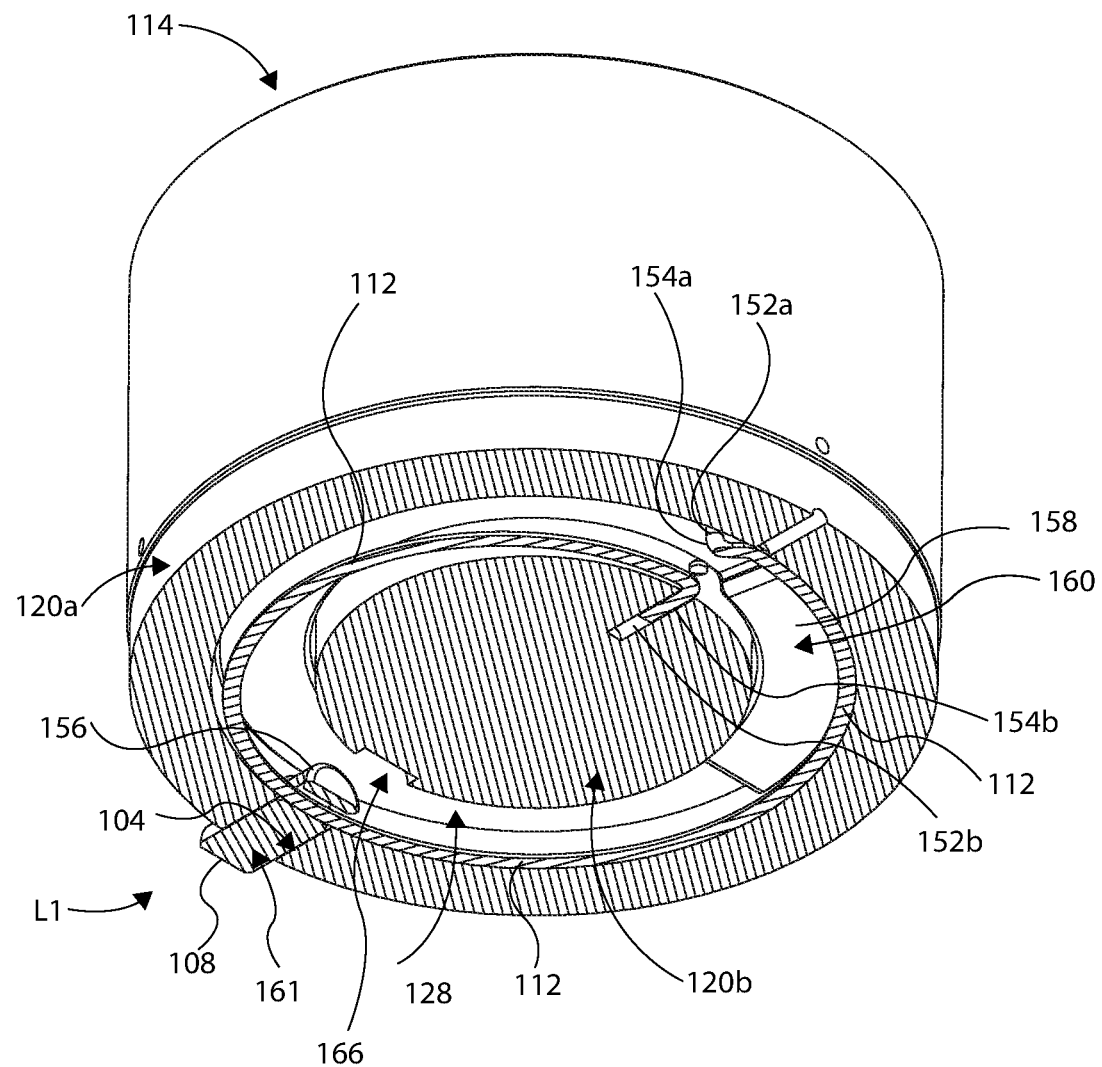
FIG. 7 is a cross-sectional view of the pin lock fastener of FIG. 1A, and taken along lines 7-7, with the cross-sectional view rotated ninety degrees.

The annular body 122 of the bolt head body 116 can comprise a cap coupling interface 134 formed about a circumferential portion of the first head portion 120a of the bolt head body 116 (see e.g., FIGS. 2, 3, and 6). The cap coupling interface 134 can extend upwardly, and can comprise a flange 136 (FIG. 6) configured to be friction fit, and rotatably interfaced with, the actuator cap 114. More particularly, the actuator cap 114 can be defined by a first cap portion 140a and a second cap portion 140b, where the first cap portion 140a extends downwardly from the second cap portion 140b, somewhat in an L-shaped cross sectional area, to be in the shape of "a cap" that fits over the bolt head body 116. The first cap portion 140a can comprise a receiver bore 142 (FIG. 3) having a cylindrical shape that is sized to receive the second head portion 120b of the bolt head body 116 (FIG. 6). Thus, the outer circumferential surface 126 of the second head portion 120b can be slidably and rotatably interfaced to an inner surface 144 of the receiver bore 142 of the actuator cap 114.

The first cap portion 140a can further comprise a bolt head coupling interface 146 configured to rotatably interface with the cap coupling interface 134 of the first head portion 120a of the bolt head body 116. Thus, the bolt head coupling interface 146 can comprise an annular recess or channel 148 that receives the flange 136 of the first head portion 120a to provide the friction fit interface that is "loose enough" to permit bi-directional rotation of the actuator cap 114 relative to the bolt 102. In this manner, the actuator cap 114 is friction fit to, and rotatably coupled to, the first head portion 120a of the bolt head body 116. In one example, a set screw (not shown) can be threaded through a side hole 151 (FIG. 6) of the actuator cap 114, and partially received in an outer annular recess 153 of the first body portion 120a, to axially secure the actuator cap 114 to the bolt 102 (i.e., to prevent the actuator cap 114 from moving in an axial direction along a central longitudinal axis Y1) while still allowing for bi-directional rotation of the actuator cap 114 about the bolt head body 116. Note that other means of rotatably coupling the actuator cap 114 to the bolt head body 116 are possible and contemplated herein.

The actuator cap 114 can further comprise an annular support portion 150 that extends downwardly toward the spring support channel 128 of the bolt head body 116. Thus, the annular support portion 150 is situated within an annular gap defined between the inner circumferential surface 132 of the first head portion 120a and the outer circumferential surface 126 of the second head portion 120b. This provides some structural support or rigidity between the actuator cap 114 and the bolt head body 116 during rotation of the actuator cap 114 relative to the bolt head body 116. In addition, the annular support portion 150 can function to further define the spring support channel 128, and particularly an upper surface or limit of the spring support channel 128.

The annular support portion 150 can comprise a first spring support hole 152a (see FIGS. 3 and 7) formed upwardly through the annular support portion 150, and which is sized to receive a first end 154a of the torsion spring 112. Similarly, the second head portion 120b of the bolt head body 116 can comprise a second spring support hole 152b formed laterally through the second head portion 120b, and which is sized to receive a second end 154b of the torsion spring 112. At an intermediate location between the first and second ends 154a and 154b of the torsion spring 112, a portion of the torsion spring 112 is interfaced to or secured to the pin 108, such that deflection of the torsion spring 112 exerts a force to the pin 108 to cause bi-directional axial movement of the pin 108 through the aperture 104. In one example, the pin 108 can comprise a spring hole 156 that extends laterally through an end of the torsion spring 112, and that receives a section of the torsion spring 112. The torsion spring 112 can be adhered or threaded or otherwise secured to the pin 108 through the spring hole 156 to secure the pin 108 to the torsion spring 112, so that the torsion spring 112 does not slide through the spring hole 156 during deflection of the torsion spring 112. Thus, movement or deflection of the torsion spring 112 effectuates or causes movement of the pin 108. Note that the sections of the torsion spring 112 that extend from each side of the spring hole 156 (FIG. 5A) of the pin 108 act as "a stop feature" to maintain or keep the position of the pin 108 so that the pin 108 does not fall out of the aperture 104, and so the pin 108 is held in the normally locked position L1. That is, the side sections of the spring 112 are interfaced against the inner circumferential surface 132 of the first head portion 120a to restrict or limit translational movement of the pin 108, thereby capturing the pin 108 as further supported by the aperture 104 of the bolt head body 116.

The annular support portion 150 can comprise a spring seat protrusion 158 (FIGS. 3 and 7) that extends downwardly toward the spring support channel 128, and that is situated laterally between the first and second head portions 120a and 120b of the bolt head body 116. The spring seat protrusion 158 extends radially around a section of the annular support portion 150, and comprises an outer radial surface 160 that interfaces with a radial section of the torsion spring 112 to help guide and deflect the torsion spring 112 about the spring support channel 128 during operation of the lock pin fastener 100. Without such feature of the spring seat protrusion 158, the first end 152a of the torsion spring 112 may tend to twist within the spring support hole 154a, which would be ineffective for proper deflection of the torsion spring 112.

Turning to the specifics of the functionality of locking and unlocking the pin lock fastener 100 (illustrated particularly in FIGS. 1C and 1D), the pin lock fastener 100 can be configured to fasten together first and second members 151a and 151b, such as first and second fastener receiver structures, which can each be support plates, brackets, or other members operable to receive a fastener (e.g., a bolt). For instance, FIG. 1D illustrates an example of a fastened assembly 101, including the pin lock fastener 100 and the at least two members 151a and 151b fastened together by the pin lock fastener 100. Accordingly, the first member 151a can comprise a first fastener opening 153, which can be a counterbore shaped opening having a cylindrical bore 155 sized and shaped to receive a lower portion of the bolt head body 116 of the bolt 102. The opening 153 can further comprise a shaft aperture 157 for receiving the shaft 118 of the bolt 102. A pin lock feature 159, such as a recess or channel, can be formed laterally through an upper surface of the first member 151a and adjacent the cylindrical bore 155, and can be sized and shaped to receive the locking end portion 110 of the pin 108 when in the normal locked position L1, as illustrated in FIG. 1D, Thus, the pin lock feature 159 is configured to restrict rotational movement of the pin 108, which therefore restricts rotational movement of the bolt 102 relative to the first and second members 151a and 151b, because the other end 161 of the pin 108 is supported inside of the aperture 104 of the bolt had body 116 (see e.g., FIGS. 6 and 7).

Regarding fastening and installing the pin lock fastener 100 to the first and second members 151a and 151b, the second head portion 120b of the bolt head body 116 can comprise a tool interface portion 160 (FIG. 6) defined by a central bore 162 formed in the second head portion 120b of the bolt head body 116, which can have a hex shape for receive a hex tool bit, in one example. Similarly, the actuator cap 114 can comprise a tool interface aperture 164 having a similar configuration and shape as that of the tool interface portion 160 (e.g., a hex shaped opening) that can be axially aligned with the tool interface portion 160 and the central bore 162 of the bolt head body 116. In this manner, a tool bit (e.g., a hex shaped tool bit) can be received through the tool interface aperture 164 and into the central bore 162 for bi-directional rotation of the pin lock fastener 100 and threading of the shaft 118 into the second member 151b during installation and removal of the pin lock fastener 100.

Accordingly, when the pin lock fastener 100 is not secured to the first and second members 151a and 151b (or if the shaft 118 is partially threaded into the second member 151b), the pin lock fastener 100 is automatically in the normal locked position L1, as shown in FIG. 1A. This is because the torsion spring 112 constantly applies the biasing force to the pin 108 to keep or maintain the locking end portion 110 of the pin 108 extended outwardly from the bolt head body 116. This can be one meaning of "normal" locked position, because the torsion spring 112 operates to expand under a no load situation to normally or nominally keep the pin 108 in a locked or extended positon to interface with at least one pin lock feature (e.g., 159) for locking the pin lock fastener 100 to a member or structure.

In this normal locked position L1, and while unsecured or not entirely fastened to the members 151a and/or 151b, the pin lock fastener 100 is ready to be operated by a user to be moved or actuated to the retracted unlocked positon U1 (as shown in the position of FIG. 1D). To move the pin 108 to the unlocked, retracted position, a user can grasp and rotate the actuator cap 114 to a certain rotational angle A (e.g., 60 degrees clockwise) about or relative to the bolt head body 116 about an axis of rotation R1, such as illustrated by the rotational arrows shown in FIGS. 1B and 10. Such rotation can occur until the tool interface aperture 164 and central bore 162 are "shape-aligned" to each other (i.e., when their hex shaped openings are aligned). In this "actuated position", the actuator cap 114 and the bolt 102 can both receive the same tool bit for fastening the bolt 102 to the first and second members 151a and 151b. For instance, the threaded end of the shaft 118 can be inserted into and secured to a threaded hole of the second member 151b, or it can be threaded to one or more nuts on the other side of the second member 151b, thereby securing or fastening the first and second members 151a and 151b together.

During such rotational movement of the actuator cap 114 in the clockwise or first direction, the torsion spring 112 is caused to compress or deflect a certain degree corresponding to the degree of rotation of the actuator cap 114, because the torsion spring 112 is coupled to the actuator cap 114 and to the bolt head body 116, as detailed above. Note that such deflection causes the torsion spring 112 to reduce in diameter, because the torsion spring 112 is formed to have at least one 360 degree turn. However, in other examples, the torsion spring 112 can be less than or more than the 360 degree curvature illustrated while still providing the requisite spring biasing force to actuate or move the pin 108. The deflection of the torsion spring 112 translates a force to the pin 108 to cause the pin 108 to be pulled inwardly toward a central, longitudinal axis Y1 of the bolt 102, such that the pin 108 translates or slides axially through the aperture 104 (as further illustrated when comparing FIGS. 5A and 5B). Note that the pin 108 can comprise a central longitudinal axis X1 that is generally orthogonal to the central longitudinal axis Y1 of the bolt 102. Accordingly, the pin 108 is configured to translate axially along the central longitudinal axis X1 of the pin 108 when moved between the retracted unlocked position U1 and the normal locked position D. Note that, the pin 108 can further be translated a sufficient distance along or through a rounded pin channel 166 formed through the channel portion 124 in the second head portion 120b of the bolt head body 116 (see FIG. 6), so as to be received within the pin channel 166, which functions to provide additional travel and clearance for the pin 108 within the bolt head body 116. The translation of the pin 108 inwardly causes the locking end portion 110 of the pin 108 to retract into the aperture 104 of the first head portion 120a, so that no portion (or very little portion) of the pin 108 extends outwardly form the outer surface 106 of the bolt head body 116 (FIGS. 1C and 5B). Therefore, in this position, the pin 108 of the pin lock fastener 100 is moved to the retracted unlocked position U1 (as shown in FIGS. 1B, 1C, and 5B), and the bolt 102 is ready to be fastened. Accordingly, the user can insert the shaft 118 of the bolt 102 into the shaft receiving aperture 157 of the first member 151a, and through a second fastener opening (not shown here) of the second member 151a for fastening the shaft 118 to the second member 151a (or to a nut). Note that the shaft 118 may be partially threaded to the second member 151b while the user rotates the actuator cap 114 to move the pin 108 of the pin lock fastener 100 to the retracted unlocked positon U1. Further note that the user can insert a hex tool bit only into the tool interface aperture 164 of the actuator cap 114 to facilitate the aforementioned rotation of the actuator cap 114 to move the pin 108 to the retracted unlocked position U1.

Once in the retracted unlocked position U1, the user can then fully insert a hex tool bit into the tool interface aperture 164 of the actuator cap 114 and into the central bore 162 of the bolt 102, which functions to maintain the actuator cap 114 in its rotated position and the pin 108 in its retracted unlocked position without the user having to maintain a hold on the actuator cap 114. Then, the user can rotate the entire pin lock fastener 100 clockwise with the tool bit to threadably secure the shaft 118 to the second member 151b (or to a nut). Thus, the actuator cap 114 and the bolt 102 rotate concurrently while threadably coupling the shaft 118 to the second member 151, and while maintaining the pin 108 in the retracted unlocked position U1 because the actuator cap 114 and the bolt 102 are rotatably locked together via the hex tool bit being inserted in to the aperture 164 and the bore 162.

Once the shaft 118 is fully threaded and once the bolt head body 116 is received into the opening 155 of the first member 151a, the user can remove the hex tool bit from engagement with the aperture 164 and the bore 162, which rotatably releases the actuator cap 114, allowing the actuator cap 114 to rotate relative to the bolt head body 116. The energy stored in the torsion spring 112 (due to the aforementioned clockwise rotation of the actuator cap 114 relative to the bolt head body 116 and compression of the torsional spring 112) causes a torque or spring force to be applied to the actuator cap 114 in the counter clockwise direction, which causes the actuator cap 114 to automatically rotate in the counter clockwise or second direction relative to the bolt head body 116. In response, the torsion spring 112 exerts a force on the pin 108 that laterally translates the pin 108 through the aperture 104, wherein the pin 108 is caused to be moved to the locked position with the locking end portion 110 of the pin 108 extending outwardly from the bolt head body 116. The actuator cap 114 can be caused to rotate a sufficient degree, such that the locking end portion 110 of the pin 108 is received into the pin lock feature 159 on the first member 151a, thus locking the pin lock fastener 100 in place to the first member 151a. Indeed, the bolt 102 is rotatably locked to the first member 151a because the pin 108 is captured into or locked into the pin lock feature 159. Note that the user may need to visually align the retracted pin 108 with the pin lock feature 159 just before releasing the actuator cap 114 from rotational restriction with the bolt head body 116, so that the pin 108 can be received within the pin lock feature 159.

Note that more than one pin lock features (e.g., like 159) can be formed around the perimeter of the opening 154 to provide different, selective locking positions for the pin 108 to the first member 151a. This can provide flexibility so that the user can choose which pin lock feature is most appropriate or required based on the rotational position of the bolt head body 116 relative to the first member 151a, as well as on the desired or required torque needed to fasten together the first and second members 151a and 151b. Further note that the bolt head body 116 may not necessarily need to be seated entirely down into the opening 155 for the pin lock fastener 100 to be rotatably locked to the first member 151a, which may be useful for shim assemblies/systems (see e.g., FIG. 8). It is further noted that the pin lock feature 159 can comprise any depth, or can be located at any elevation (as measured from the surface of the first member 151a), so as to receive and capture the pin 108 depending upon the depth of the bolt 102 relative to the first member 151a.

A particular pin lock feature (e.g., pin lock feature 159) can be any suitable stop surface or component or feature that is configured to interface with the locking end portion 110 of the pin 108 to restrict rotational movement of the pin 108. For instance, a pin lock feature may be one or more protrusions that extend upwardly from a face of a fastener receiver structure or member, and that operates to "trap" or capture the locking end portion 110 of the pin 108. Another example of a pin lock feature can be a set screw or pin, or some other attachable component, which can be installed into a face of a fastener receiver structure or member, so that the screw or pin acts as a "stop" to interface with and restrict rotation of the pin.

Notably, the pin lock fastener 100 can be repeatedly installed, uninstalled and reinstalled an infinite number of times to and from support structures or members, without losing its locking capability. This is because, unlike other locking fasteners like nylon nuts or Loctite screws for instance, the pin lock fasteners of the present disclosure do not get damaged or altered during initial installation and removal of the pin lock fasteners. Moreover, the pin lock fasteners of the present disclosure are mechanically locked in a manner to prevent the pin lock fastener from loosening because, when locked and secured to structures or members, the torsion spring (or coil spring of FIG. 11) continuously and autonomously applies a biasing force to the pin to maintain its capture within the pin lock feature, without human or machine assistance or interaction, so that the pin is maintained and supported in the normal locked position. Moreover, the spring and the pin are "fastenerless" and therefore do not rely on threads or other threaded components to maintain the pin in the locked position. This helps to ensure maintaining the pin in the locked position in high vibration environments that normally tend to "un-thread" threaded locking features or components of traditional locking fasteners. Further note that the pin, spring, and actuator cap of the example discussed herein are permanently attached together to a fastener component, so that a user is not required to remove or add any external components (e.g., set screw, thread lock material, etc.) to lock the fastener to a structure. This also helps to prevent foreign object debris (FOD) because users are not required to remove or add components to the pin lock fastener during installation or removal.

Note that reference to a "user" operating the pin lock fasteners of the present disclosure can be replaced with a machine operable to install and uninstall a particular pin lock fastener to and from structures or members. For instance, a user or a controller can operate a robotic arm or fastening system that can insert a tool bit to rotate the actuator cap to move the pin lock fastener to the unlocked position, and then use the tool bit to fasten the bolt to a structure or nut, for instance, and then continue the operations discussed herein to secure and rotatably lock the pin lock fastener to the structures or members. This is not always possible to use a mincing to install certain locking fasteners, because human interaction and installation may be required.

It is further noted that the pin lock fasteners of the present disclosure can be used with a wide variety of members to be fastened together. One such example is that the pin lock fasteners discussed herein can be operable with a wedge lock design (or other critical parts) to ensure they do not vibrate loose over time. For example, a wedge lock can refer to a type of fastener assembly that is used to secure components in place in a radar system. The wedge lock fastener can use a long threaded rod that clamps together a series of wedges, forcing the overall size to increase, which in turn, applies a friction force between the fastener and panel it is holding in place. The present pin lock fastener taught herein can be used to ensure the threaded rod of the wedge lock assembly never vibrates loose.

Figure 8:
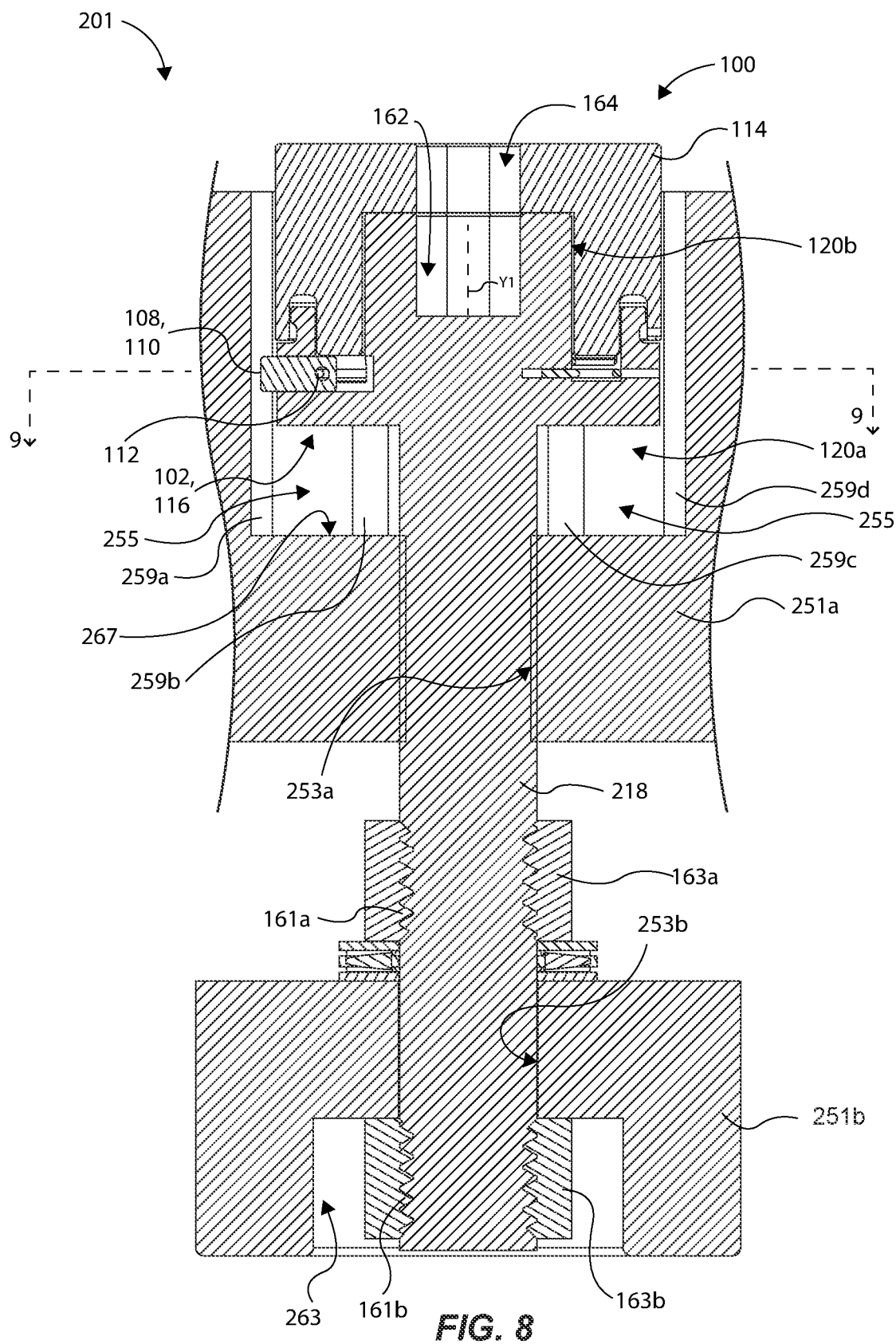
FIG. 8 is a side cross-sectional view of a fastened assembly including the pin lock fastener of FIG. 1A fastening together first and second members, in accordance with an example of the present disclosure.
Figure 9:
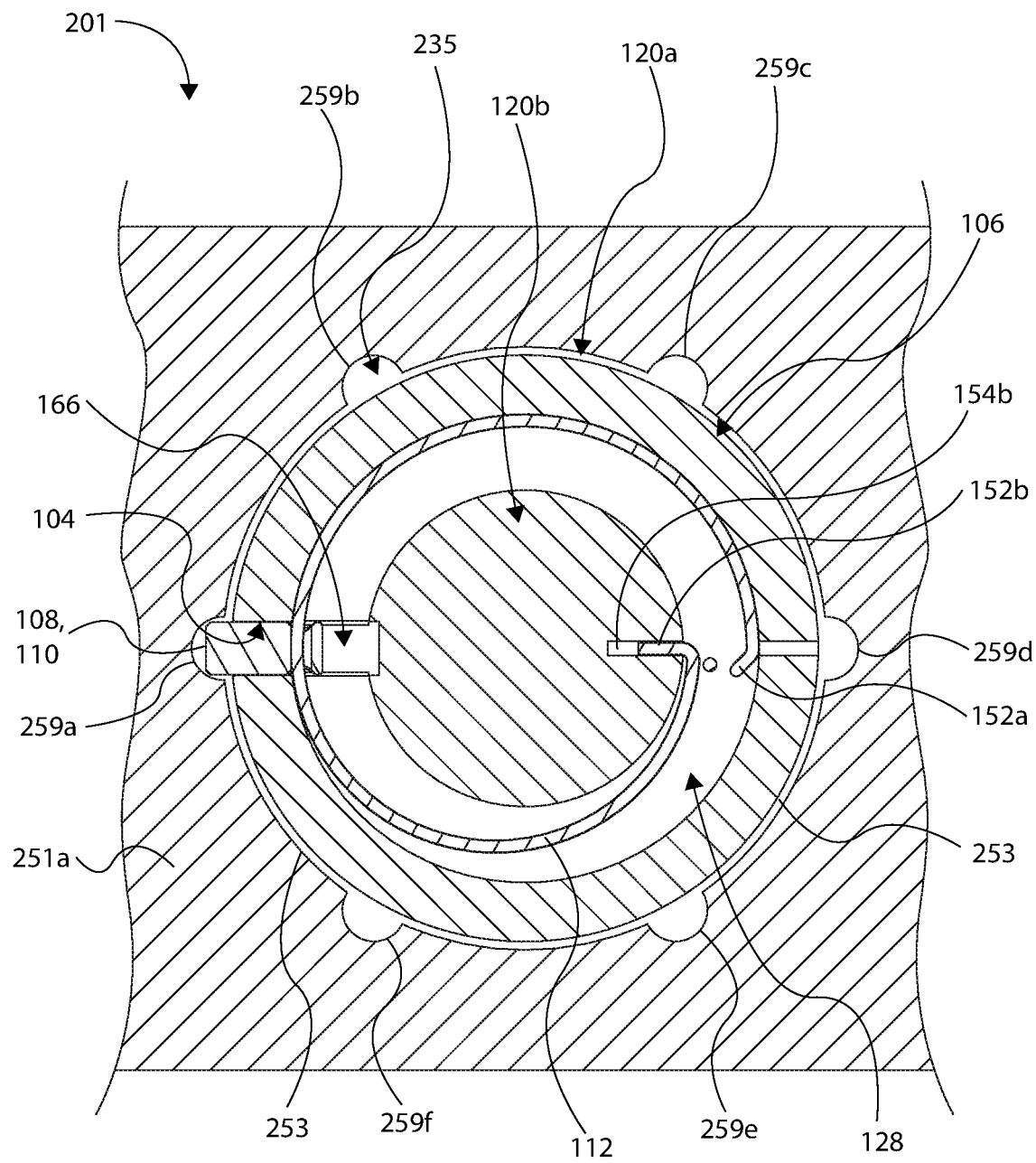
FIG. 9 is a top down cross sectional view of the fastened assembly of FIG. 8, taken along lines 9-9.

FIGS. 8 and 9 illustrate an example of a fastened assembly 201, in accordance with an example of the present disclosure. More specifically, the fastened assembly 201 can comprise the pin lock fastener 100 and the first and second members 251a and 251b, such as first and second fastener receiver structures, which can each be plates or blocks or shim pads or other members operable to receive a fastener component, such as the bolt 102 of the pin lock fastener 100. Thus, the first and second members 251a and 251b are fastened together by the pin lock fastener 100, as shown in FIG. 8. Note that the pin lock fastener 100 is the same as the fastener described with reference to FIGS. 1A-7, except that a shaft 218 of the bolt 102 comprises two separated threaded sections 161a and 161b for being threadably coupled to respective first and second nuts 163a and 163b of a shim system, as detailed below.

Accordingly, the first member 251a can comprise a first fastener opening 253a configured to receive the shaft 218, and a cavity 255 configured to receive the bolt head body 116 and at least a portion of the actuator cap 114 and the shaft 118. Thus, the first fastener opening 253a and the cavity 255 are in fluid communication with each other. The second member 251b can comprise a second fastener opening 253b that receives a smooth section of the shaft 218 between the first and second threaded sections 161a and 161b. The second member 251b can have a cap shaped body or section comprising a nut cavity 263 for receiving the second nut 163b. In this manner, a user can rotate one or both nuts 163a and/or 163b to axially move or translate the bolt 102 upwardly or downwardly, which facilitates adjusting a position of the second member 251b relative to the first member 251a, thereby providing a shim system. This may be useful for micro or small adjustments of two fastened structures or members 251a and 251b.

To this end, note that the bolt head body 116 is "floating" in the cavity 255 axially along the central longitudinal axis Y1 of the bolt 102, because the bolt head body 116 is not fully seated or interfaced to a bottom surface 267 of the cavity 255 of the first member 251a. However, the bolt head body 116 remains rotatably locked to the first member 251a because the pin 108 is interfaced or locked to a pin lock feature 259a formed along the cavity 255. This allows for the bolt head body 116 to move axially bi-directionally along the central longitudinal axis Y1 relative to the first member 251a, while the nuts 163a and 163b are operated to "shim" or move the second member 251b relative to the first member 251a.

As shown in the top-down cross sectional view of FIG. 9, the first member 251a can comprise a plurality of pin lock features 259a-f spatially separated from each other and formed around the cavity 255. Each pin lock feature 259a-f can be formed as a semi-circular shaped channel (or other suitable shape) that extends vertically along the cavity 255 from a top surface of the first member 251 to the bottom surface 267. Providing a plurality of separated pin lock features in this manner provides the user with the ability to selectively choose a particular pin lock feature that the pin 108 will be locked into, which may be useful in scenarios where a first member may have limited area or functionality to accommodate for only a single pin lock feature.

Notably, the pin 108 is visible from above by a user (or camera of an installation assembly) to ensure the pin 108 is in the normal locked position to ensure that the pin lock fastener 100 is rotatably secured to the first member 151a.

Figure 10A:
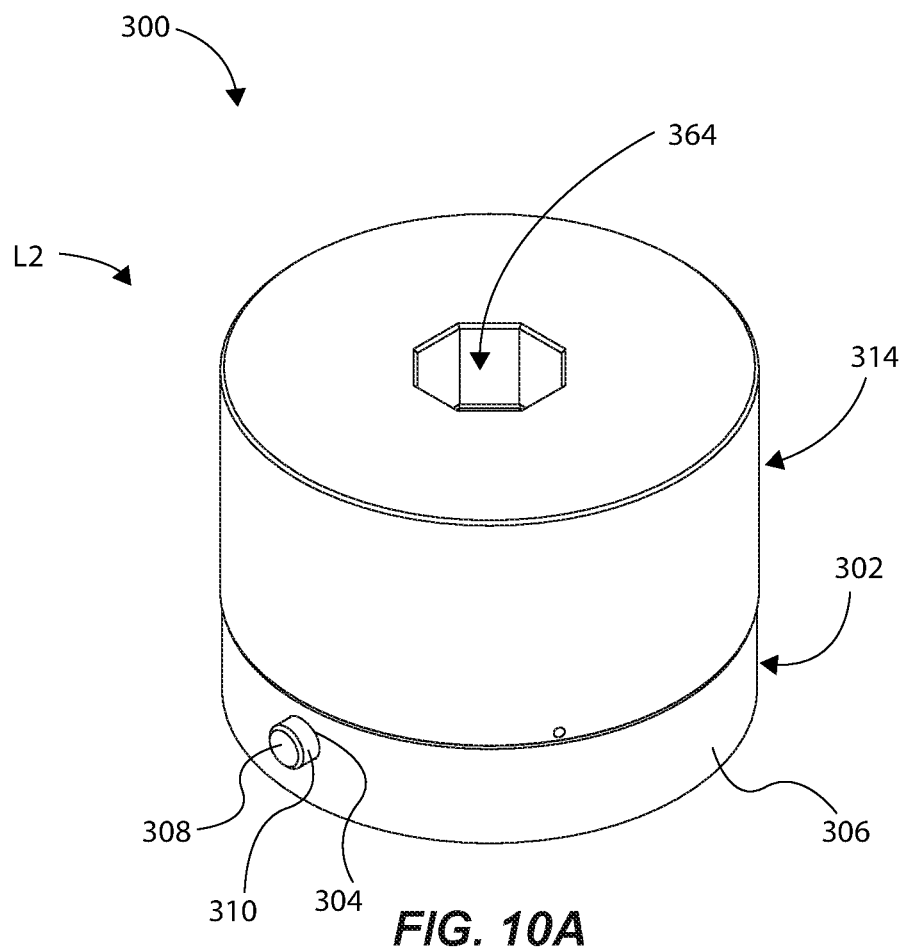
FIG. 10A is an isometric view of a pin lock fastener in a normal locked position, in accordance with an example of the present disclosure.
Figure 10B:
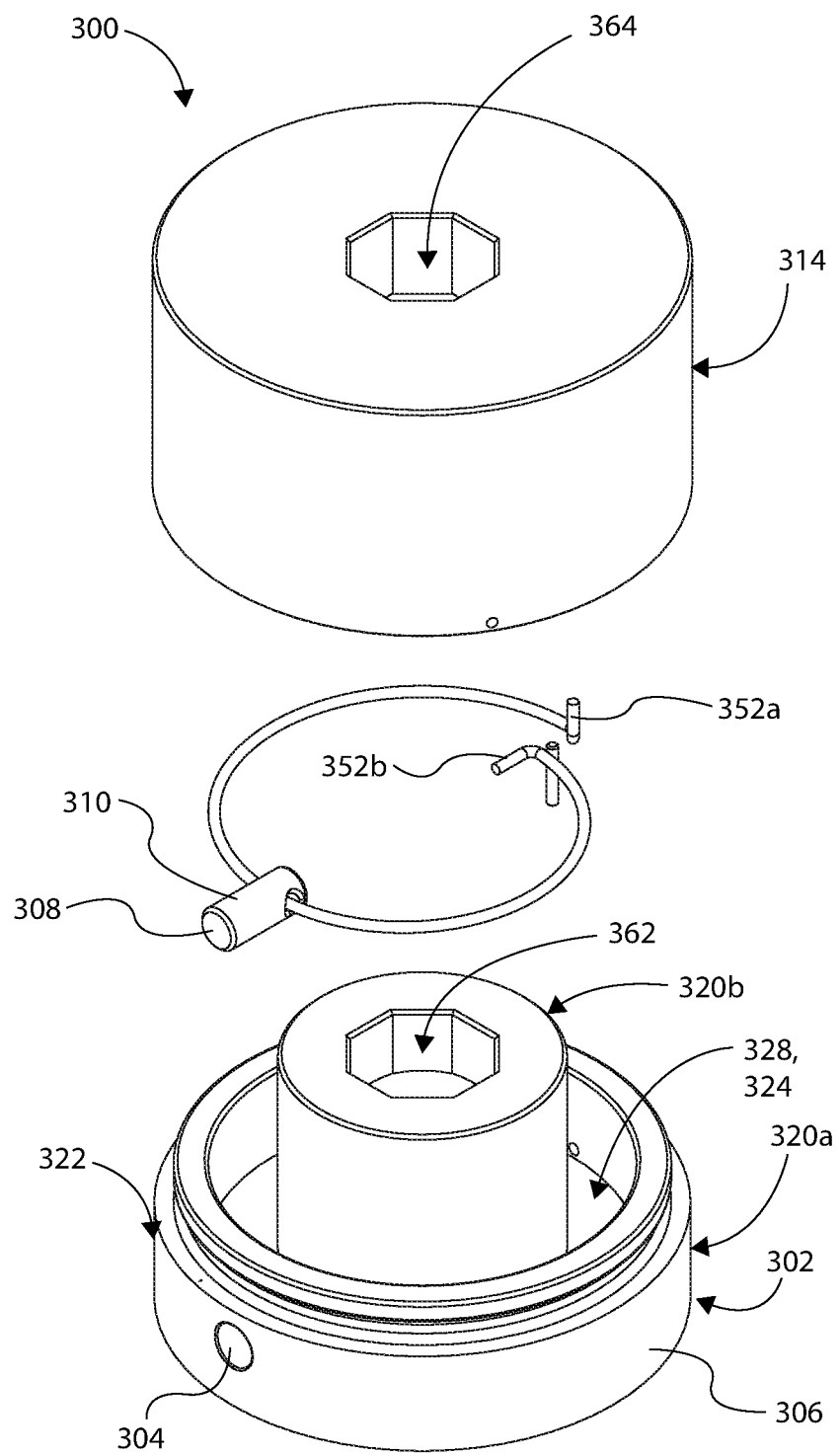
Figure 10C:
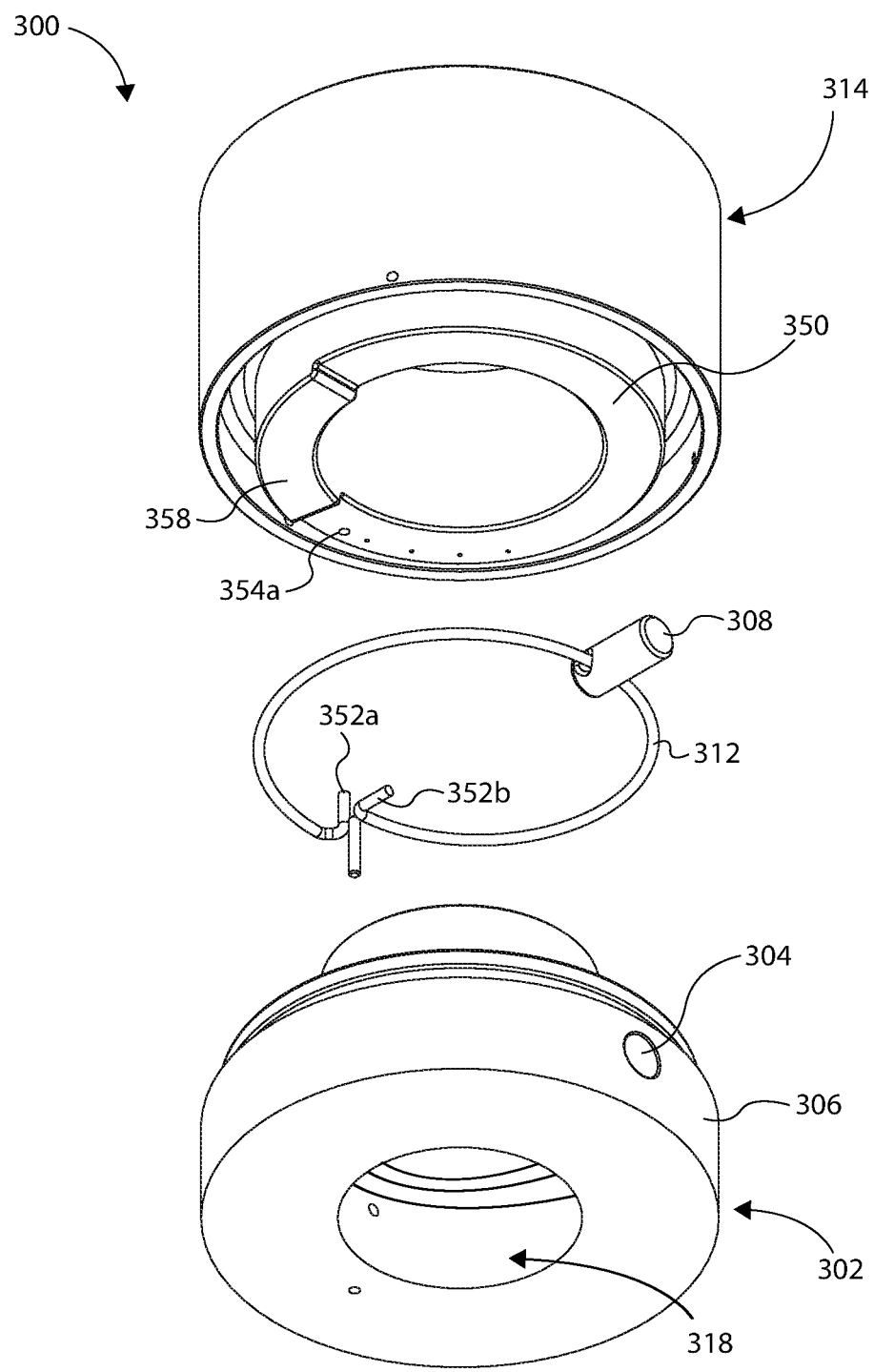
FIG. 10C shows another exploded isometric view of the pin lock fastener of FIG. 10A from a different perspective.

FIGS. 10A-C illustrate a pin lock fastener 300, in accordance with another example of the present disclosure. The pin lock fastener 300 can be configured to fasten or secure together two or more fastener receiver structures or members, and operable to be rotatably locked to one of the fastener receiver structures or members, similarly as described above regarding pin lock fastener 100. The pin lock fastener 300 can be configured as a "nut" fastener device or component that is operable to receive a threaded shaft portion of a standard bolt for rotatably locking or securing the pin lock fastener 300 to a fastener receiver structure (e.g., 151a, 251a, wherein the bolt can be initially inserted into the second member 151b through both the first and second members 151a and 151b, such that its threaded end extends above the surface of the first member 151a ready to receive the pin lock fastener 300). Note that the pin lock fastener 300 can comprise many of the same or similar features of the pin lock fastener 100 described above, and therefore possesses and achieves similar functionality, as should be appreciated by the drawings and descriptions herein. Indeed, the pin lock fastener 300 is configured to be normally or automatically placed in a normal locked position L2 (see FIG. 10A), and operable by a user (e.g., by hand or tool) to be moved to a retracted unlocked position (see e.g., FIGS. 1B and 1C), before and during a fastening operation to fasten together two or more structures or members.

The pin lock fastener 300 can comprise a fastener component, such as a nut body 302, which can include an aperture 304 formed through an outer surface 306 of the nut body 302. The pin lock fastener 300 can further comprise a pin 308 supported by the nut body 302 and slidable through the aperture 304. The pin 308 can comprise a locking end portion 310 that extends outwardly from the outer surface 306 of the nut body 302 when in the normal locked position L2. The pin lock fastener 300 can comprise an elastic element, such as a torsion spring 312 supported by the nut body 302 and operable to apply a biasing force to the pin 308. The torsion spring 312 can operate to bias the pin 308 in the normal locked position L2, such that the locking end portion 310 of the pin 308 extends outwardly from the outer surface 306 of the nut body 302 to interface or lock with a fastener receiver structure or member (see e.g., FIGS. 1D and 8). The pin lock fastener 300 can further comprise a pin actuation component, such as an actuator cap 314 rotatably coupled to the nut body 302 and operable to facilitate application of a force to actuate the pin 308, via deflection of the torsion spring 312, from the normal locked position L2 to the retracted unlocked position. Similarly as described above, when in the normal locked position L2, the locking end portion 310 of the pin 308 is operable to interface with a fastener receiver structure or member (e.g., FIG. 1D) to restrict rotation of the nut body 302 relative to a fastener receiver structure.

The nut body 302 can comprise a threaded aperture 318 for receiving and being threadably coupled to threads of a shaft of a bolt. The nut body 302 can comprise a first head portion 320a and a second head portion 320b that extends upwardly from the first head portion 320a, similarly formed as the bolt head body 116 discussed above. The first head portion 320a can comprise the outer surface 306 that extends circumferentially around a perimeter of the nut body 302, and can comprise the aperture 304 that is formed laterally through an annular body 322 of the first head portion 320a. The first head portion 320a can further comprise a channel portion 324 that extends between the annular body 322 and the second head portion 320b. The nut body 302 can comprise a spring support channel 328 that extends about or around the nut body 302. Indeed, the spring support channel 328 can be defined by surfaces of the nut body 302, similarly as described above regarding the bolt head body 116.

At least a portion of the torsion spring 312 can be situated or disposed through at least a portion of the spring support channel 328, so that the torsion spring 312 can deflect during unlocking and locking operations of the pin lock fastener 300. The nut body 302 can be interfaced and rotatably coupled to the actuator cap 314 in the same manner as the pin lock fastener 100 described above, and therefore many of the features of the pin lock fastener 300 will not be labeled and discussed in great detail in this example.

Turning to the functionality of locking and unlocking the pin lock fastener 300, and with reference to the example illustrated in FIGS. 1C and 1D regarding the pin lock fastener 100, the pin lock fastener 300 can be configured to fasten together first and second members (e.g., 151a and 151b), along with a standard bolt that can be extended through fastener openings of the first and second members, and then threaded to the nut body 302 of the pin lock fastener 300. More specifically, the second head portion 320b of the nut body 302 can comprise a central bore 362, which can have a shape (e.g., a hex shape) for receiving a tool bit (e.g., a hex tool bit). Similarly, the actuator cap 314 can comprise a tool interface aperture 364 having a hex shaped opening and being axially aligned (and shaped-aligned) with the central bore 362 of the nut body 302. In this manner, a hex shaped tool bit can be received into the tool interface aperture 364 and central bore 362 for bi-directional rotation of the pin lock fastener 300 during installation and removal of the pin lock fastener 300.

Accordingly, when the pin lock fastener 300 is not secured to a standard bolt (or it may be partially threaded to a standard bolt), the pin 308 of the pin lock fastener 300 is in the normal locked position L2, as shown in FIG. 10A. This is because the spring 312 constantly applies the biasing force to the pin 308 to keep or maintain the locking end portion 310 extended outwardly from the nut body 302. In this normal locked position L2, and while unsecured or unfastened to a standard bolt, the pin lock fastener 300 is ready to be operated by a user to be moved or actuated to the retracted unlocked positon (see e.g., FIG. 1C). Initially, a user can grasp and rotate the actuator cap 314 to a certain rotational angle (e.g., 60 degrees clockwise) about or relative to the nut body 302, and to a position until the tool interface aperture 364 and central bore 362 are aligned (i.e., when their hex shaped openings are aligned). In this position, the actuator cap 314 and the nut body 302 can both receive the same tool bit for fastening the nut 302 to a standard bolt (or even to bolt 102). During such rotational movement of the actuator cap 314 in the clockwise or first direction, the torsion spring 312 is caused to compress or deflect a certain degree corresponding to the degree of rotation of the actuator cap 314, because the torsion spring 312 is coupled to the actuator cap 314 and to the nut body 302, as detailed above. The deflection of the torsion spring 312 translates a force to the pin 308 to cause the pin 308 to be pulled inwardly, such that the pin 308 translates or slides axially through the aperture 304 (see e.g., 5B).

This translation of the pin 308 inwardly causes the locking end portion 310 of the pin 308 to retract into the aperture 304 of the first head portion 320a to the retracted unlocked position. Then, the user (or machine) can then fully insert a hex tool bit into the tool interface aperture 364 of the actuator cap 314 and the central bore 362 of the nut body 302, and can rotate the entire pin lock fastener 300 clockwise to threadably secured the nut body 302 to a threaded shaft of a standard bolt. Thus, the actuator cap 314 and the nut body 302 rotate concurrently during threadably coupling the pin lock fastener 300 to the shaft of the standard bolt, while maintaining the pin 308 in the retracted unlocked position. Once the pin lock fastener 300 is fully threaded to a standard bolt, and the nut body 302 is received into an opening (e.g., 153) of a first member (e.g., 151a), the user can remove the hex tool bit from engagement with the pin lock fastener 300, which allows the actuator cap 314 to rotate relative to the nut body 302. The energy stored in the torsion spring 312 causes a torque or biasing force to the actuator cap 314 in the counter clockwise direction, which causes the actuator cap 314 to automatically rotate in the counter clockwise or second direction relative to the nut body 302. In response, the torsion spring 312 exerts a force on the pin 308 that laterally translates the pin 308 through the aperture 304, so that the locking end portion 310 of the pin 308 extends outwardly from the nut body 302, and such that the locking end portion 310 is received into and rotatably locked by a pin lock feature (e.g., see pin lock feature 159 of FIG. 1D) of a fastener receiver structure (e.g., 151a). Thus, the nut body 302 is now rotatably locked to the fastener receiver structure (e.g., 151a), because the pin 308 is captured into or locked into the channel shape of the pin lock feature (e.g., 159).

Figure 11:
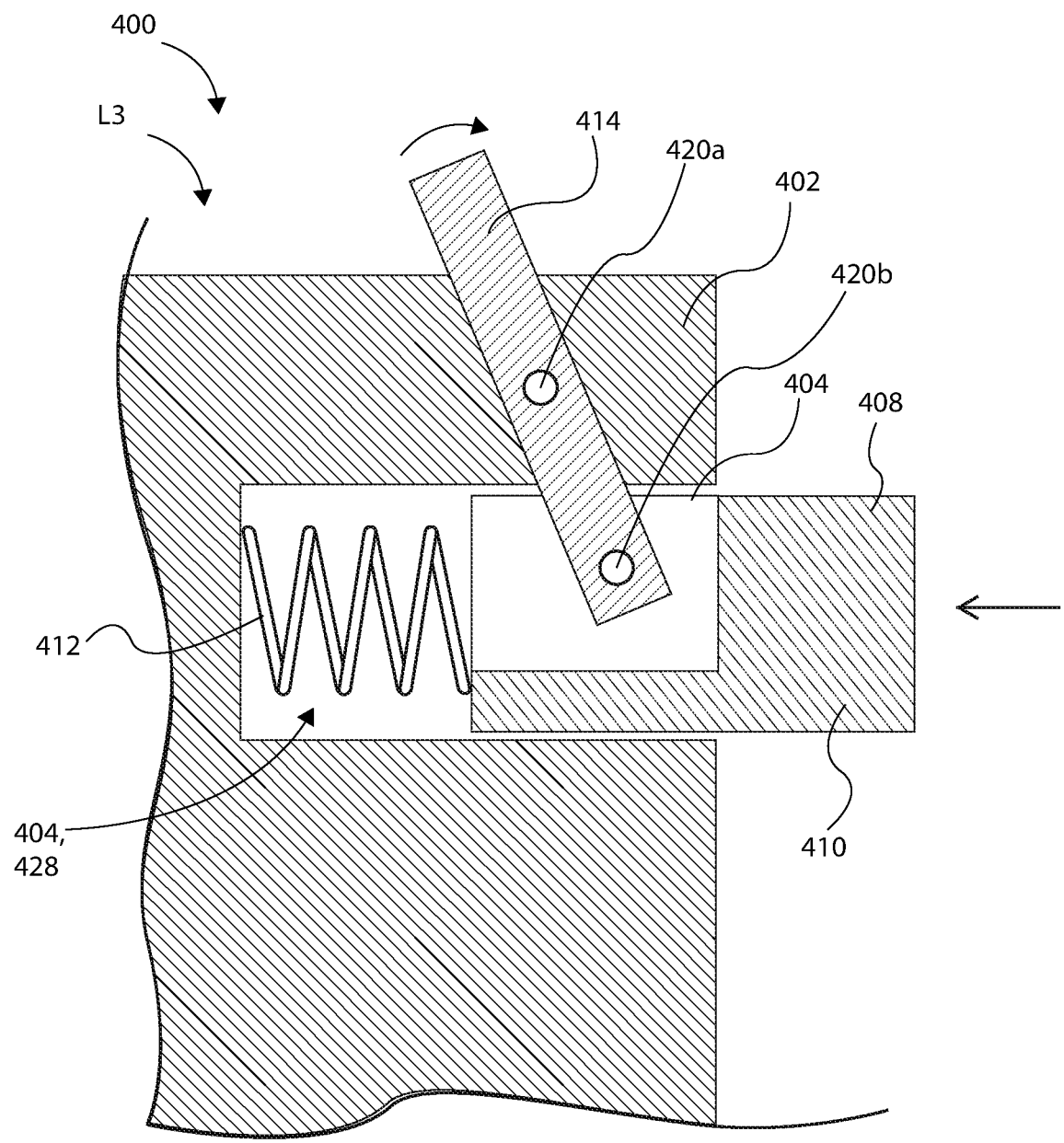
FIG. 11 is a side cross sectional view of a pin lock fastener in a normal locked position, in accordance with an example of the present disclosure.

FIG. 11 illustrates a pin lock fastener 400, in accordance with an example of the present disclosure. The pin lock fastener 400 can be configured to fasten or secure together two or more fastener receiver structures or members, and operable to be rotatably locked to one of the fastener receiver structures or members, similarly as described above regarding pin lock fastener 100. The pin lock fastener 400 can be configured as a "bolt" or a "nut" fastener device or component that is operable to receive a nut or bolt, respectively, for rotatably locking or securing the pin lock fastener 400 to a fastener receiver structure (e.g., 151a, 251a). Indeed, the pin lock fastener 400 is configured to be normally or automatically placed in a normal locked position L3, and operable to by a user (or machine) to be moved to a retracted unlocked position before and during a fastening operation to fasten together two or more structures or members.

The pin lock fastener 400 can comprise a fastener component 402, such as a nut or a bolt, which can include an aperture 404 formed through an outer surface 406 of the fastener component 402. The pin lock fastener 400 can further comprise a pin 408 supported by the fastener component 402 and slidable through the aperture 404. The pin 408 can comprise a locking end portion 410 that extends outwardly from the outer surface 406 of the fastener component 402 when in the normal locked position L3. The pin lock fastener 400 can comprise an elastic element, such as a coil spring 412 supported by the fastener component 402 and operable to apply a biasing force to the pin 408. The coil spring 412 can operate to bias the pin 408 in the normal locked position L3, such that the locking end portion 410 of the pin 408 extends outwardly from the outer surface 406 of the fastener component 402 to interface or lock with a fastener receiver structure or member (see e.g., FIG. 1D). The pin lock fastener 400 can further comprise a pin actuation component, such as a lever 414 pivotally coupled to the fastener component 402 by a first pivot member 420a, and pivotally coupled to the pin 408 by a second pivot member 420b. Thus, the lever 414, extending above the fastener component 402, is operable to facilitate application of a force to actuate the pin 408, via deflection of the coil spring 412, from the normal locked position L3 to the retracted unlocked position (i.e., a position where the pin 408 is fully or mostly retracted into the aperture 404). Similarly as described above, when in the normal locked position L3, the locking end portion 410 of the pin 408 is operable to interface with a fastener receiver structure or member (e.g., FIG. 1D) to restrict rotation of the fastener component 402 relative to the fastener receiver structure.

The fastener component 402 can comprise a spring support cavity 428 defined by the aperture 404 (note that the aperture 404 can be a bore instead of a hole like aperture 104). Thus, the spring support aperture 428 is configured to seat the spring 412 between one end of the pin 408 and a seat surface of the spring support cavity 428. When the pin lock fastener 400 is not secured to a nut or a standard bolt, the pin lock fastener 400 is in the normal locked position L3, as shown. This is because the coil spring 412 is configured as a compression spring that normally applies the biasing force to the pin 408 to keep or maintain the locking end portion 410 extended outwardly from the fastener component 402.

In this normal locked position L3, and while unsecured or unfastened to a standard bolt or nut, the pin lock fastener 400 is ready to be operated by a user to be moved or actuated to the retracted unlocked positon (see e.g., FIG. 1C), The user can then grasp and rotate the lever 414 and rotate it clockwise, which causes the pin 408 to translate inwardly through the aperture 404 via respective pivoting motions about the first and second pivot members 420a and 420b, thereby further compressing the spring 412. This translation of the pin 408 inwardly causes the locking end portion 410 of the pin 408 to retract into the aperture 404 to the retracted unlocked position. Note that FIG. 11 is somewhat schematically illustrated, and it should be appreciated that those skilled in the art can readily make the pin lock fastener 400 and practice the invention in view of the above description.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above, Rather, the specific features and acts described above are disclosed as example forms of implementing the claims, Numerous modifications and alternative arrangements may be devised without departing from the spirit and scope of the described technology.

What is claimed is:

1. A pin lock fastener, comprising:
   a fastener component having an aperture formed through an outer surface of the fastener component;
   a pin supported by the fastener component and slidable through the aperture, the pin comprising a locking end portion;
   an elastic element supported by the fastener component and operable to apply a biasing force to the pin, the elastic element biasing the pin in a normal locked position such that the locking end portion of the pin extends outwardly from the outer surface of the fastener component; and
   a pin actuation component coupled to the fastener component and operable to facilitate application of a force to actuate the pin from the normal locked position to a retracted unlocked position, wherein, when in the normal locked position, the locking end portion of the pin is operable to interface with a fastener receiver structure to restrict rotation of the fastener component relative to the fastener receiver structure.

2. The pin lock fastener of claim 1, wherein at least a portion of the elastic element is situated within the aperture, and wherein the elastic element is interfaced to the pin to apply the biasing force.

3. The pin lock fastener of claim 1, wherein the elastic element comprises one of a coil spring or a torsion spring.

4. The pin lock fastener of claim 1, wherein the pin comprises a central longitudinal axis generally orthogonal to a central longitudinal axis of the fastener component, and wherein the pin is configured to translate axially along the central longitudinal axis of the pin when moved between the retracted unlocked position and the normal locked position.

5. The pin lock fastener of claim 1, wherein, when in the normal locked position, the pin extends beyond the outer surface of the fastener component, the elastic element interfaced to an end of the pin opposite the locking end portion.

6. The pin lock fastener of claim 1, wherein the fastener component comprises a bolt, the bolt comprising a bolt head body and a shaft extending from the bolt head body, the bolt head body comprising the aperture and at least partially supporting the elastic element.

7. The pin lock fastener of claim 6, wherein the pin actuation component comprises an actuator cap bi-directionally rotatably coupled to the bolt head body, wherein the elastic element comprises a torsion spring having one end coupled to the actuator cap and the other end coupled to the bolt head body, and wherein the pin is coupled to the torsion spring between the ends of the torsion spring, such that rotation of the actuator cap causes deflection of the torsion spring to actuate the pin.

8. The pin lock fastener of claim 7, wherein the bolt head body comprises a spring support channel that extends annularly about the bolt head body, wherein at least a portion of the torsion spring is retained and extends through the spring support channel, and wherein the spring support channel is in fluid communication with the aperture of the bolt head body.

9. The pin lock fastener of claim 7, wherein the bolt head body comprises a tool interface portion having a central bore, and wherein the actuator cap comprises a tool interface aperture axially aligned with the central bore, wherein the central bore and the tool interface aperture are configured to facilitate fastening the bolt to the fastener receiver via a tool when in the retracted unlocked position.

10. The pin lock fastener of claim 7, wherein the actuator cap comprises a first coupling interface formed about a circumferential portion of the actuator cap, and wherein the bolt head body comprises a second coupling interface formed about a circumferential portion of the bolt head body and that is rotatably interfaced to the first coupling interface, such that the actuator cap is rotatable about an axis of rotation that is substantially collinear with an axis of rotation of the bolt.

11. The pin lock fastener of claim 7, wherein a portion of the torsion spring is secured through a hole formed through an end of the pin, such that rotation of the actuator cap relative to the bolt head body in a first direction causes the torsion spring to deflect, thereby causing the pin to axially translate through the aperture of the bolt head body to the retracted unlocked position.

12. The pin lock fastener of claim 1, wherein the fastener component comprises a nut body comprising the aperture and supporting the pin, and at least partially supporting the elastic element, the nut body configured to be fastened to a bolt.

13. The pin lock fastener of claim 12, wherein the pin actuation component comprises an actuator cap bi-directionally rotatably coupled to the nut body, wherein the elastic element comprises a torsion spring having one end coupled to the actuator cap and the other end coupled to the nut body, and wherein the pin is coupled to the torsion spring between the ends of the torsion spring, whereby rotation of the actuator cap relative to the nut body causes the torsion spring to deflect, thereby causing the pin to axially translate through the aperture of the nut body.

14. The pin lock fastener of claim 1, wherein the pin actuation component comprises a lever pivotally coupled to the fastener component and pivotally coupled to the pin, wherein the elastic element comprises a coil spring supported in the aperture of the fastener component and configured to bias the pin in the normal locked position, such that user engagement of the lever causes the pin to move to the retracted unlocked position via compression of the spring.

15. The pin lock fastener of claim 1, wherein the outer surface of the fastener extends circumferentially around a perimeter of the fastener component, and the aperture is formed laterally within the outer surface.

16. The pin lock fastener of claim 1, wherein the fastener component comprises a first central longitudinal axis, and the pin comprises a second longitudinally axis substantially orthogonal to the first longitudinal axis, and wherein the pin is slidable along the second longitudinal axis.

17. The pin lock fastener of claim 1, wherein the fastener receiver structure is a member that is fastened by the fastener component.

18. A pin lock fastener, comprising:
a fastener component having an aperture formed through an outer surface of the fastener component;
a pin supported by the fastener component and slidable through the aperture, the pin comprising a locking end portion;
an actuator cap rotatably coupled to the fastener component; and
a torsion spring having a first end coupled to the fastener component and a second end coupled to the actuator cap, wherein the pin is secured to the torsion spring between the first and second ends of the torsion spring, the torsion spring operable to apply a biasing force to the pin in a normal locked position, such that the locking end portion of the pin extends outwardly from the outer surface of the fastener component,
wherein the actuator cap is operable to be rotated relative to the fastener component in a first direction that causes deflection of the torsion spring, thereby actuating the pin from the normal locked position to a retracted unlocked position to facilitate threadably securing the fastener component to a fastener receiver structure, and wherein, when the fastener component is secured to the fastener receiver structure, the torsion spring exerts a biasing force to rotate the actuator cap in a second direction and to return the locking end portion of the pin to the normal locked positon to lock the pin to the fastener receiver structure to restrict rotation of the fastener component relative to the fastener receiver structure.

19. The pin lock fastener of claim 18, wherein the fastener component comprises a spring support channel that extends annularly about the fastener component, and wherein at least a portion of the torsion spring is retained and extends through the spring support channel.

20. The pin lock fastener of claim 18, wherein the fastener component comprises a tool interface portion having a central bore, and wherein the actuator cap comprises a tool interface aperture axially aligned with the central bore, wherein the central bore and the tool interface aperture are configured to receive a tool and facilitate fastening the pin lock fastener to the fastener receiver structure via the tool.

21. The pin lock fastener of claim 18, wherein the actuator cap comprises a first coupling interface formed about a circumferential portion of the actuator cap, and wherein the fastener component comprises a second coupling interface formed about a circumferential portion of the fastener component and that is rotatably interfaced with the first coupling interface, such that the actuator cap is rotatable about an axis of rotation that is substantially collinear with an axis of rotation of the fastener component.

22. A fastened assembly, comprising:
a first member having a first fastener opening;
a second member having a second fastener opening;
a pin lock fastener that fastens together the first and second members, the pin lock fastener comprising:
a fastener component secured to at least one of the first member or the second member;
a pin supported by the fastener component and comprising a locking end portion; and
an elastic element supported by the fastener component and operable to apply a biasing force to the pin such that the locking end portion of the pin is interfaced to at least one pin lock feature of the first member, thereby restricting rotation of the fastener component relative to the first member.

23. The fastened assembly of claim 22, wherein the fastener component comprises a bolt having a bolt head body and a threaded shaft that extends from the bolt head body, the threaded shaft extending through the first fastener opening of the first member and through the second fastener opening of the second member, wherein the first member further comprises a cavity that receives at least a portion of the bolt head body, and wherein the at least one pin lock feature is formed about the cavity.

24. The fastened assembly of claim 23, wherein the at least one pin lock feature comprises a plurality of channels formed vertically about the cavity and are spatially separated from each other, wherein one of the channels interfaces with the locking end portion of the pin to restrict rotation of the bolt relative to the first and second members.

25. The fastened assembly of claim 23, further comprising shim nuts threadably coupled to the shaft on either side of the second member for facilitating adjustment of an axial position of the first member relative to the second member, such that the bolt head body is axially movable through the cavity, in response to operating the shim nuts, while being restricted from rotational movement via the pin locked to the at least one pin lock feature.

26. The fastened assembly of claim 22, further comprising a pin actuation component bi-directionally rotatably coupled to the fastener component, wherein the elastic element comprises a torsion spring having one end coupled to the pin actuation component and the other end coupled to the fastener component, and wherein the pin is coupled to the torsion spring between the ends of the torsion spring, whereby rotation of the pin actuation component relative to the fastener component causes the torsion spring to deflect, thereby causing the pin to axially translate through an aperture of the fastener component to rotatably unlock the pin lock fastener from the first member.

\* \* \* \* \*